United States Patent
Kalous

(10) Patent No.: US 7,535,346 B2
(45) Date of Patent: May 19, 2009

(54) TRAILER ALARM

(75) Inventor: D. Scott Kalous, Kenosha, WI (US)

(73) Assignee: Master Lock Company LLC, Oak Creek, WI (US)

( * ) Notice: Subject to any disclaimer, the term of this patent is extended or adjusted under 35 U.S.C. 154(b) by 158 days.

(21) Appl. No.: 11/656,677

(22) Filed: Jan. 23, 2007

(65) Prior Publication Data

US 2007/0241869 A1 Oct. 18, 2007

Related U.S. Application Data

(60) Provisional application No. 60/792,549, filed on Apr. 17, 2006.

(51) Int. Cl.
  *G08B 21/00* (2006.01)
(52) U.S. Cl. .................. 340/431; 340/425.5; 340/426.1
(58) Field of Classification Search ................ 340/431, 340/425.5, 426.1, 687; 307/10.8, 9.1
See application file for complete search history.

(56) References Cited

U.S. PATENT DOCUMENTS

| | | | |
|---|---|---|---|
| 4,127,855 A | | 11/1978 | Toner |
| 4,430,637 A | * | 2/1984 | Koch-Ducker et al. ...... 340/431 |
| 4,737,763 A | * | 4/1988 | DeFino et al. ............ 340/426.1 |
| 5,059,945 A | * | 10/1991 | Scheele et al. ......... 340/426.18 |
| 5,378,929 A | | 1/1995 | Mor et al. |
| 5,434,552 A | | 7/1995 | Ems |
| 5,522,530 A | | 6/1996 | Boettcher |
| 6,166,627 A | * | 12/2000 | Reeley .................... 340/426.25 |
| 6,466,028 B1 | * | 10/2002 | Coppinger et al. .......... 324/504 |
| 6,501,376 B2 | * | 12/2002 | Dieckmann et al. ......... 340/479 |
| 6,512,455 B2 | * | 1/2003 | Finn et al. ................ 340/572.1 |
| 6,525,654 B1 | * | 2/2003 | Siggers ....................... 340/438 |
| 6,737,960 B2 | | 5/2004 | Preston |
| 6,844,829 B2 | | 1/2005 | Mayor |
| 7,034,683 B2 | | 4/2006 | Ghazarian |
| 7,038,585 B2 | | 5/2006 | Hall et al. |
| 7,081,813 B2 | | 7/2006 | Winick et al. |
| 7,091,857 B2 | | 8/2006 | Lanigan et al. |
| 7,307,514 B2 | * | 12/2007 | McAden ..................... 340/431 |
| 2004/0095227 A1 | * | 5/2004 | Lehman ................... 340/425.5 |
| 2007/0241869 A1 | | 10/2007 | Kalous |
| 2007/0262853 A1 | | 11/2007 | Bradus et al. |
| 2008/0042809 A1 | | 2/2008 | Watts et al. |

OTHER PUBLICATIONS

International Search Report and Written Opinion from International Application No. PCT/US2007/08326, mailed Sep. 3, 2008.
Armed Guard Sport Alarm product information from http://www/alarm-guard.com, 1 page, dated at least as early as Mar. 26, 2006.

(Continued)

*Primary Examiner*—Eric M Blount
(74) *Attorney, Agent, or Firm*—Calfee, Halter & Griswold LLP

(57) ABSTRACT

A trailer/cargo alarm detects the proximity of trailer or cargo attached to a vehicle with an alarm system. If the trailer/cargo is moved out of proximity of the vehicle, the alarm system issues an alert. The proximity of the trailer or cargo may be detected, for example, by detecting the presence of the trailer lighting within the vehicle's electrical circuit, by dedicated hardwired sensors, or wireless detection apparatus.

24 Claims, 6 Drawing Sheets

OTHER PUBLICATIONS

"Trailer Dog Alarm Security System", Product Review from http://bikebone.com, 2 pgs., dated at least as early as Feb. 4, 2005.

"Mobile Lock GPS Locator with Anti-Theft Alarm-D5500" product information, 1 pg from http://www.dewalt.com/us/products/tool_detail.asp?productID=10784, date at least as early as Jul. 6, 2007.

Trailer-Alarms.com, Vericom Technologies product information from http://www/trailer-alarms.com/vericom.htm., pp. 1-2, dated at least as early as Nov. 22, 2006.

Armed Guard Electronic Security, "Portable Alarm System" product information, 2 pgs., dated at least as early as Mar. 6, 2006.

"Pro-Tec System One Trailer Security Systems, Professional Technology to Pro-Tec Your Investment" Tornal Systems LLC product information, 16 pgs., dated at least as early as Oct. 20, 2005.

Armed Guard GForce product information, http://www/alarm-guard.com, 3 pgs., dated at least as early as Mar. 26, 2006.

* cited by examiner

TRAILER ALARM

CROSS-REFERENCE TO RELATED APPLICATIONS

This non-provisional application claims the benefit of U.S. Provisional Patent Application No. 60/792,549, entitled "Trailer Alarm," filed on Apr. 17, 2006, the entire disclosure of which is incorporated herein by reference, to the extent that it is not conflicting with the present.

FIELD OF THE INVENTION

This invention relates to vehicle alarm systems and alarms for trailers attached to vehicles.

BACKGROUND OF THE INVENTION

Trailers can be designed to couple or otherwise attach to a truck, sports utility vehicle, or other such vehicle capable of towing the trailer. Trailers can be designed for towing large and heavy items and as a result, trailers often carry valuable items. For example, trailers often are used to tow boats, automobiles, all terrain vehicles, motorcycles, and commercial goods. Such goods and items are often transported across large distances. During such a trip, the vehicle and the attached trailer carrying the valuable items are often left unattended while the driver stops to rest for the night or eat a meal. Such circumstances leave the trailer and cargo susceptible to theft.

The trailer itself can also be a valuable item. Many trailers are designed for a specific purpose, such as towing a boat or a pair of wave runners, and, as a result, can be relatively expensive. Boats or wave runners are often towed to a lake or other such body of water, removed from the trailer, and put into use. This leaves the vehicle and the trailer coupled to the vehicle unattended and a potential target of theft.

It is desirable to develop and design novel methods and apparatus that are capable of deterring the theft of a trailer or cargo carried on the trailer. Such methods and apparatus can provide greater security against the unauthorized removal of a trailer and its cargo.

DESCRIPTION OF THE DRAWINGS

In the accompanying drawings, which are incorporated in and constitute a part of this specification, embodiments of the invention are illustrated, which, together with the description of the invention serve to illustrate the principles of this invention. The drawings and detailed description are not intended to and do not limit the scope of the invention or any subsequent claims in any way. Instead, the drawings and description only describe embodiments of the invention and other embodiments of the invention not described are encompassed by this disclosure of the invention.

DETAILED DESCRIPTION

The Detailed Description of the Invention merely describes preferred embodiments of the invention and is not intended to limit the scope of the claims in any way. Indeed, the invention as described by the claims and specification is broader than and unlimited by the preferred embodiments, and the terms in the claims have their full ordinary meaning.

This invention and disclosure are directed to methods and apparatus for securing trailers coupled to towing vehicles to prevent the theft of the trailer or cargo carried on the trailer. Such methods and apparatus are designed to detect when a trailer or cargo is separated from the towing vehicle. In addition, the methods and apparatus can be designed to alert the owner or others that the trailer or cargo is separated from the towing vehicle. In one embodiment, this alert can take the form of an audible alert, such as a siren.

The invention includes embodiments for detecting when a trailer is decoupled from the towing vehicle as well as embodiments for detection when the trailer is moved a defined distance away from the towing vehicle. In addition, the invention includes embodiments to detect when cargo is removed from the trailer or when the cargo is moved a defined distance from either the towing vehicle or the trailer.

Figure 1:
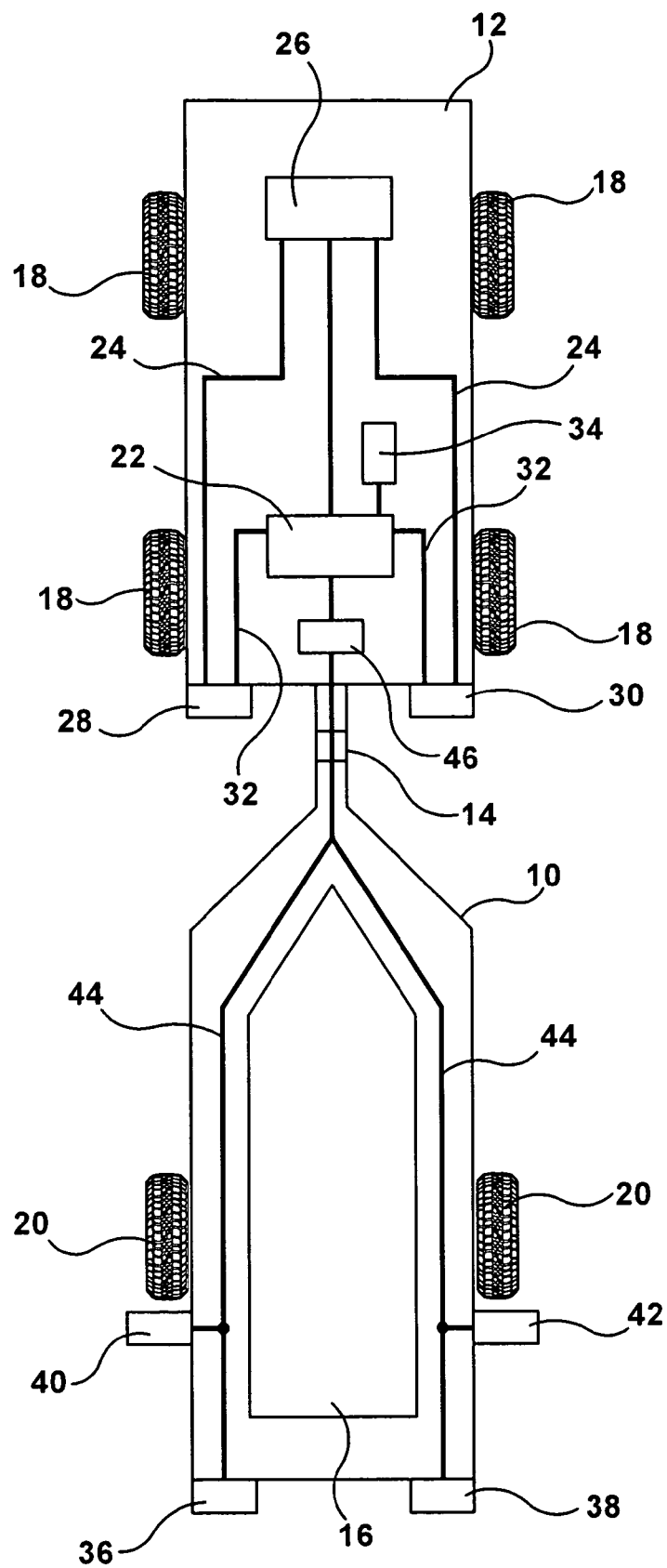
FIG. 1 is a schematic view of an embodiment of an alarm arranged in accordance with the present invention.

Referring to FIG. 1, an exemplary embodiment of the invention is schematically illustrated. A trailer 10 carrying cargo is coupled to a towing vehicle 12. The trailer 10 is coupled to the towing vehicle 12 at a connection joint 14 including a hitch ball connected to the towing vehicle 12 and a coupler connected to the trailer 10. In the exemplary embodiment of FIG. 1, the cargo carried on the trailer 10 is a boat 16. Although the cargo as shown is a boat, the cargo can be any number of items, such as for example, commercial goods, all terrain vehicles, motorcycles, automobiles, and the like. The towing vehicle 12 includes four tires 18 and the trailer 10 includes two tires 20.

An alarm 22 is attached to the towing vehicle 12. As shown, the alarm 22 is mounted to the underside of the towing vehicle 12 body. It is to be understood that the alarm 22 can be positioned in any number of alternative locations on the towing vehicle 12 or the trailer 10, such as for example, the underside of the trailer 10 or in the passenger cabin of the towing vehicle 12.

The vehicle 12 and trailer 10 are both equipped with lighting systems. Such systems are safety features for vehicles and trailers. These systems include turning signal lights and brake lights at the rear of the vehicle or trailer to alert surrounding vehicles of a driver's intention to turn, slow, or stop the vehicle. In addition, these lighting systems include running lights which allow drivers of surrounding vehicles to see a towing vehicle or trailer more clearly when driving at dusk or at night. When a trailer is attached to a towing vehicle, the trailer or cargo being carried on the trailer can obscure the rear lights of the vehicle. To reduce the likelihood of such a hazard, the lighting system of the trailer is typically connected to the lighting system of the towing vehicle. This connection allows for the trailer lighting system to detect signals from the towing vehicle lighting system, which allows for the rear lights of the trailer to appropriately signal when the towing vehicle is braking or making a turn.

The connection of the trailer lighting system to the vehicle lighting system provides an opportunity to integrate the alarm system into this connection. Referring again to FIG. 1, vehicle wiring 24 electrically connects a vehicle battery 26 to the left rear light 28 and the right rear light 30 of the towing vehicle 12. The vehicle wiring 24 provides electrical power from the battery 26 to the rear lights 28 and 30. The vehicle wiring 24 also carries signals to the rear lights 28 and 30 to command the lights 28 and 30 to blink when the driver engages a turn signal or to illuminate when the driver depresses the brake pedal.

Alarm wiring 32 electrically connects the rear lights 28 and 30 to the alarm 22. This connection can provide power to the alarm 22 from the vehicle battery 26 and can pass on command signals to the alarm 22. Electrical power is typically provided to the rear lights 28 and 30 only when the vehicle engine is running. In view of that fact, the vehicle battery 26 is directly connected to the alarm 22 to ensure that the alarm 22 is powered even when the engine is not running. Optionally, an alarm battery 34 can be mounted to the vehicle 12 to provide another source of power for the alarm 22. The alarm battery 34 can power the alarm 22 in the event that the vehicle battery 26 dies or the connection between the vehicle battery 26 and the alarm 22 is severed. For security purposes, the alarm battery 34 can be integrated into the alarm 22 such that the connection between the alarm battery 34 and the alarm 22 cannot be severed without detection.

The trailer lighting system includes a left rear light 36, a right rear light 38, a left side light 40, a right side light 42. Trailer wiring 44 electrically connects the trailer lights 36, 38, 40, 42 to the alarm 22. With both the vehicle lighting system and the trailer lighting system connected to the alarm 22, the alarm 22 can pass command signals from the vehicle lighting system to the trailer lighting system, to properly illuminate the trailer rear lights 36 and 38 and side lights 40 and 42. For example when the driver of the vehicle 12 engages the left turn signal, the signal passes through the vehicle lighting system, through the alarm, to the trailer lighting system, and to the left tail light 36 of the trailer 10 such that the light 36 blinks to indicate the vehicle 12 is about to turn left. This same method is applicable to the driver engaging the right turn signal, depressing the brake pedal, engaging the running lights, and the like.

Trailers typically do not have independent sources of electrical power and must draw electrical power from a towing vehicle. The connection of the trailer lighting system to the alarm 22 can allow the alarm 22 to pass electrical power from the vehicle lighting system to the trailer lighting system to power the trailer lights 36, 38, 40, 42. Alternatively, the trailer lights 36, 38, 40, 42 can be powered by the vehicle battery 26, which is directly connected to the alarm 22. By providing power directly from the battery 26 to the trailer lighting system, through the alarm 22, no additional electrical load is placed on the vehicle lighting system by the trailer lights 36, 38, 40, 42. This arrangement may assure that the load on the vehicle lighting system stays within the range for which it is designed.

Lighting systems can come in at least two varieties. In one variety, a single bulb or filament is used for both a turn signal and a brake light and in a second variety two separate bulbs or filaments are used for the turn signal and the brake light. If the vehicle lighting systems and the trailer lighting system differ and are not compatible, the alarm 22 can be arranged to convert the signal from the vehicle lighting system before sending an adjusted signal to the trailer lighting system.

Figure 2:
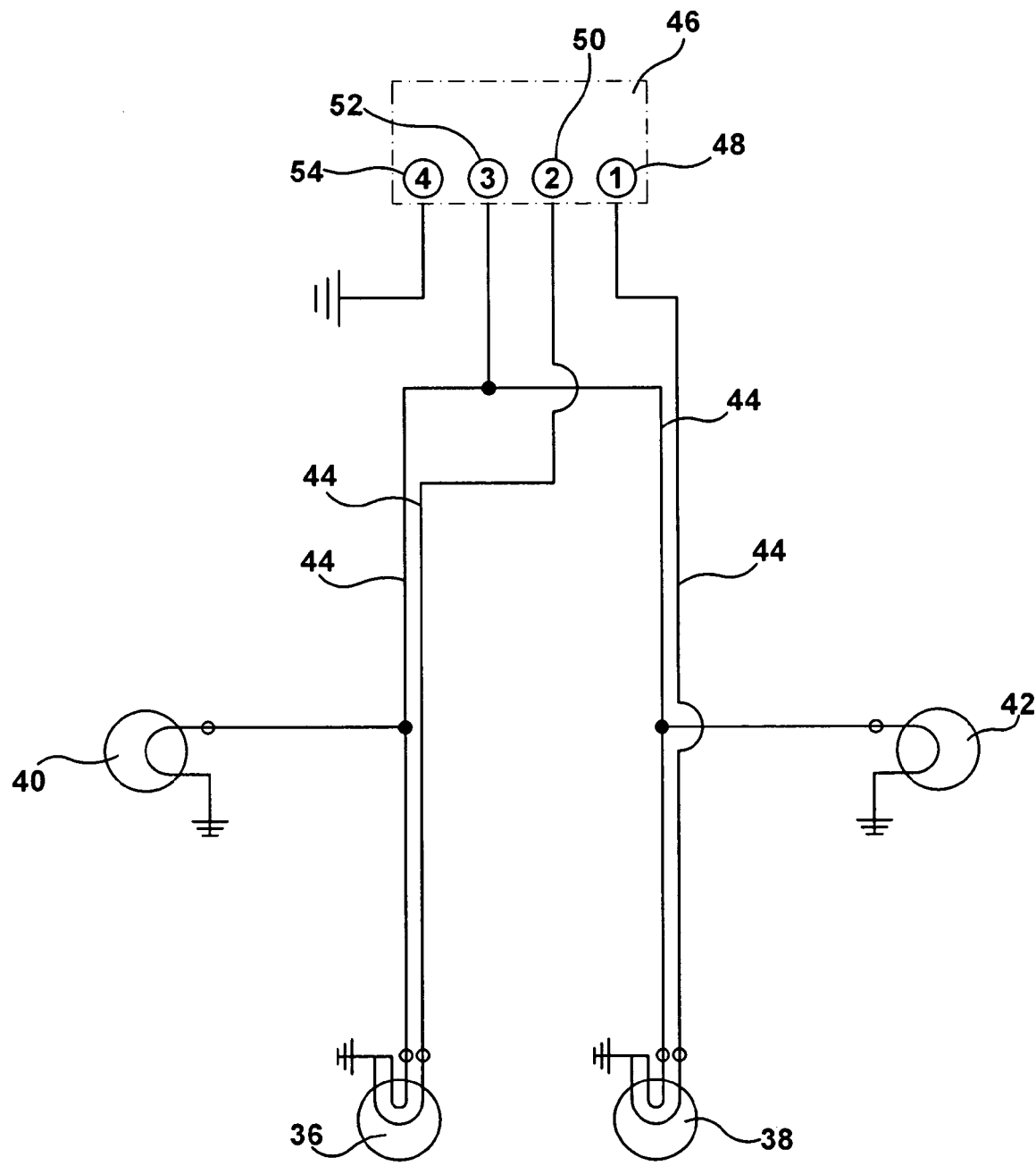
FIG. 2 is a schematic view of electrical circuits of a trailer lighting system attached to the alarm of FIG. 1.

By utilizing the alarm 22 to connect the trailer lighting system to the vehicle lighting system, the alarm 22 can be arranged to detect or determine when the trailer 10 is detached or moved away from the towing vehicle 12. As shown schematically in FIG. 2, a four connector plug 46 is attached to the trailer lighting system. The plug 46 creates the physical connection between the trailer lighting system and the alarm 22. The trailer lighting system includes three electrical circuits connected to the plug and one electrical ground. The plug 46 has four separate connection points 48, 50, 52, 54. The connection points 48, 50, 52, 54 can be either a series of four pins or a series of four receptacles, with the alarm 22 including corresponding mating receptacles or pins, respectively.

The alarm 22 can detect and evaluate the three circuits through the connection points 48, 50, 52, 54. The first connection point 48 is in electrical contact with a first circuit that runs to the right rear light 38; the second connection point 50 is in electrical contact with a second circuit that runs to the left rear light 36; the third connection point 52 is in electrical contact with a third circuit which runs to both rear lights 36 and 38 and to both side lights 40 and 42; and the fourth connection point 54 is in electrical contact with an electrical ground. The first circuit is used to illuminate the right rear light 38 when the right turn signal is engaged or the brake is depressed. The second circuit is use to illuminate the left rear light 36 when the left turn signal is engaged or the brake depressed. The third circuit is used to illuminate all four trailer lights 36, 38, 40, 42 when the running lights are turned on.

The alarm 22 can be arranged to continuously monitor or periodically sample the first, second, or third connection points 48, 50, 52 to determine if the trailer lighting system circuits are closed or open. If the circuit is closed, the alarm 22 takes no action. If the circuit is open, the alarm 22 issues an alert.

If the trailer 10 is detached from the towing vehicle 12 and moved a material distance away from the towing vehicle 12, the trailer lighting system must be separated from the alarm 22. When the trailer lighting system is separated from the alarm 22, each of the three circuits will be open. Once the alarm 22 detects an open circuit, the alarm can issue an audible alert to warn that the trailer is being moved by an unauthorized person. The circuits will be open if the plug 46 is detached from the alarm, the wiring 44 connecting the trailer lighting system to the alarm 22 is severed, or other similar circumstances.

The alarm 22 can be designed to allow a circuit to be open for a relatively short period of time without the alarm 22 issuing an audible alert. This time period can be chosen to account for the circuit being momentarily open due to vibrations during driving, physical impact on various components, or other instances of noise in the electrical systems. As an example, the alarm 22 can be designed to sample a circuit every ten milliseconds with an audible alert triggered only if the circuit is open during two consecutive samples. The described time period is exemplary only; however, the time period should be short enough to prevent an unauthorized person from quickly disconnecting the plug 46 and replacing it with a device that will replicated a closed circuit on the first, second, and third connection points 48, 50, 52.

The alarm 22 can be designed such that the vehicle owner or other authorized persons can activate and deactivate the alarm 22. One exemplary method of activating and deactivating the alarm is by a wireless remote device, such as a key fob using infrared or radio signals. Alternatively, a key pad can be mounted on the towing vehicle 12 or in the passenger cab and connected to the alarm 22 to allow the owner to enter a security code to arm or disarm the alarm 22. In addition, the alarm system can be automatically deactivated when certain vehicle or carrier conditions are met, such as the opening of doors.

The alarm 22 is described as issuing an audible alert when a circuit is open. This warning method is exemplary only. Any method of warning the vehicle owner or those near the vehicle is included in the invention. For example, a visual warning such as a flashing light or a wireless message sent to the vehicle owner's cell phone, pager or other such device are variations of the invention as described herein.

Figure 3:
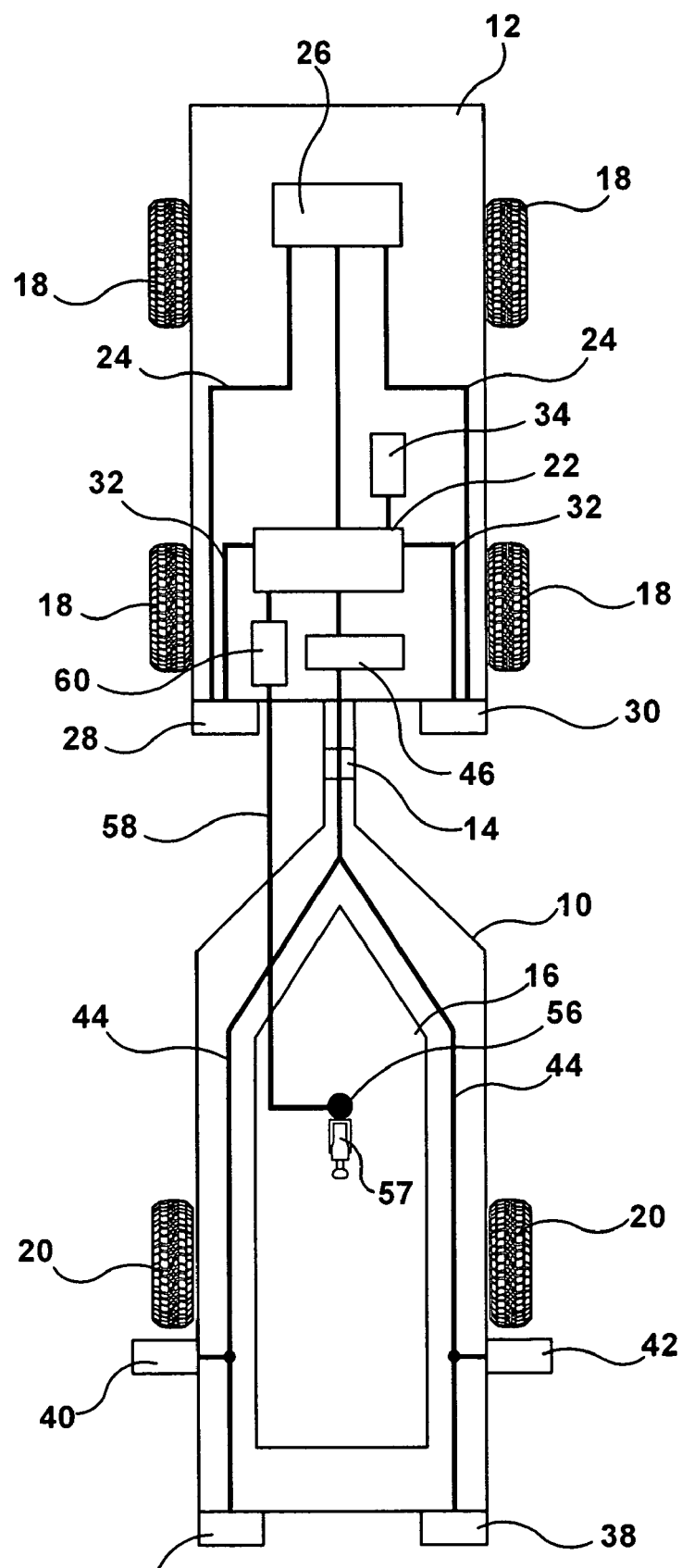
FIG. 3 is a schematic view of another embodiment of an alarm arranged in accordance with the present invention.

Additional apparatus can be added to further secure cargo carried on the trailer 10. As shown in FIG. 3, a sensor 56 can be attached the boat 16 or other cargo carried on the trailer 10. When used separately, the sensor 56 may be mounted on a bike rack, cargo carrier, or items in the bed of a pick up truck. The sensor 56 is in electrical communication with the alarm 22 through sensor wiring 58 and a sensor head 60. The sensor wiring supports a circuit between the sensor head 60 and the sensor 56. The sensor wiring may be integral to the structure of a vehicle, a trailer, a bike rack, or cargo carrier. The sensor head 60 is similar to the plug 46 described above in that it offers connection points through which the alarm 22 can detect if a circuit leading to the sensor 56 is closed or open. Additional sensors (not shown) or sensor features may be included, such as proximity or vibration sensors, to alternatively detect tampering with the cargo to which the sensor head 60 or additional sensors are attached. If the circuit is open, or the proximity or vibration sensors are triggered, the alarm 22 can issue an audible alert that the cargo is being moved away from the towing vehicle. The sensor may include the additional feature of a vehicle power adaptor 57 that provides a battery power receptacle for use for lights, etc.

If an unauthorized person attempts to remove the boat 16 from the trailer 10 or remove the trailer 10 from the towing vehicle 12, the sensor 56 may be removed from the boat 16 or the sensor wiring 58 has to be severed or detached from the sensor head 60. Either of these actions open the circuit between the sensor head 60 and the sensor 56. The alarm 22 is arranged to detect such an open circuit. In one exemplary embodiment, the sensor 56 can be a mechanical switch with two positions. When the sensor 56 is attached to the boat 16, the attachment forces the switch into a first position that allows a closed circuit from the sensor head 60 to the sensor 56. If the sensor 56 is detached from the boat 16, the switch moves to a second position that does not allow a circuit to form between the sensor head 60 and the sensor 56.

Figure 4:
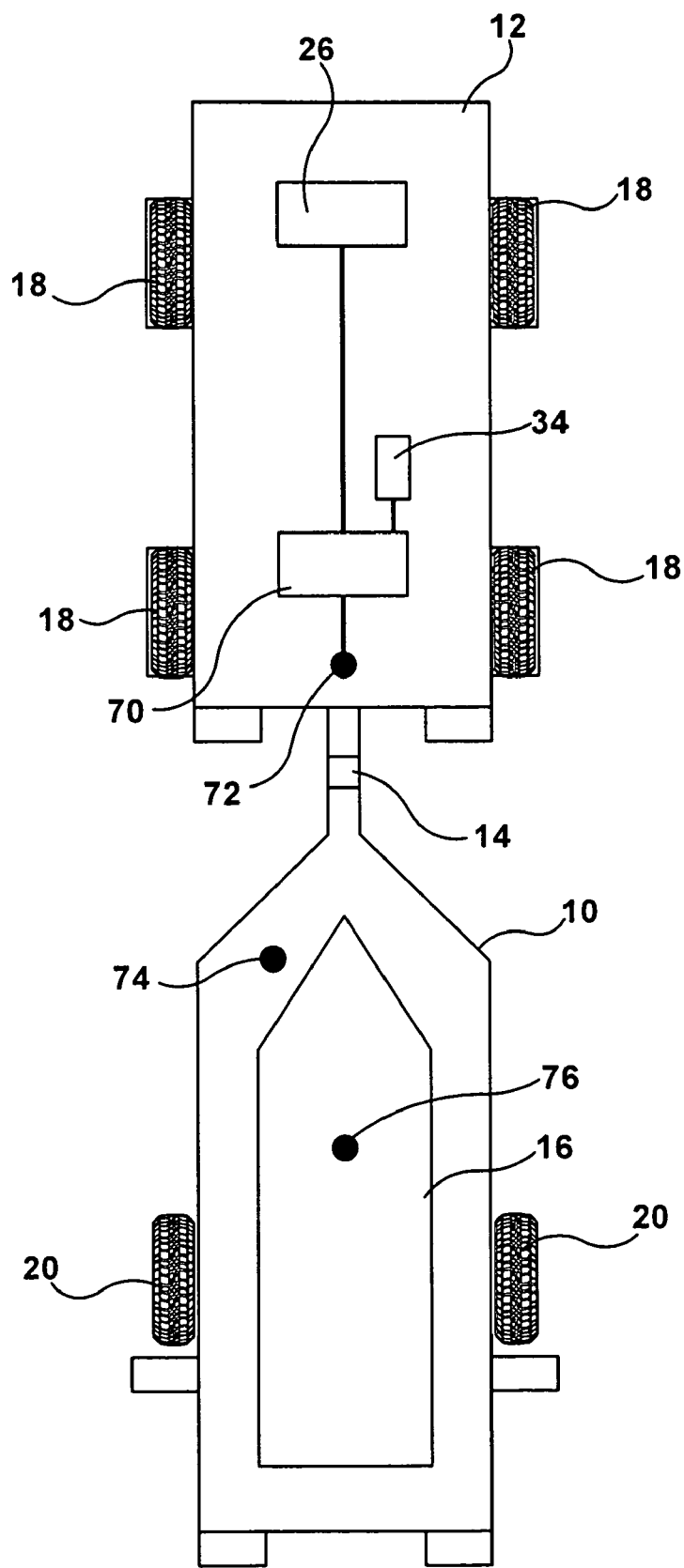
FIG. 4 is a schematic view of yet another embodiment of an alarm arranged in accordance with the present invention.

FIG. 4 schematically represents another embodiment of the present invention. The embodiment shown in FIG. 4 illustrates a wireless system for detecting if a trailer 10 or cargo carried on the trailer 10 is moved a defined distance away from a towing vehicle 12. Similar to the description above, the alarm 70 is directly attached to the vehicle battery 26 to power the alarm. An alarm battery 34 is included to provide backup power to the alarm 70 in the event connection to the vehicle battery 26 is lost. However, instead of being connected to the vehicle 12 and trailer 10 lighting systems, the alarm 70 is connected to a radio frequency (RF) transmitter 72 also attached to the towing vehicle 12. A RF receiver 74 is secured to the trailer 10 and an RF receiver 76 is secured to the cargo. The RF transmitter 72 transmits a signal intended to be received by the RF receivers 74 and 76. The RF receivers 74 and 76 are arranged such that when receiving such a signal, the receivers 74 and 76 reflect a portion of the signal back to be detected by the transmitter 72.

Whether or not a receiver receives a signal from a transmitter and reflects a portion of the signal back to the transmitter is determined by the strength of the signal and the distance between the receiver and transmitter. The strength of a transmitted signal can be adjusted to set a maximum distance a transmitter and receiver can be separated with the transmitter still receiving the reflected signal from the receiver.

In the exemplary embodiment, the signal sent by the transmitter 72 can be adjusted to set a maximum distance the trailer 10 or cargo can move away from the towing vehicle 12 with the transmitter 72 still receiving the reflected signal from the receivers 74 and 76. For example, the signal generated by the transmitter 72 can be set such that the receivers 74 and 76 on the trailer 10 and the cargo can only receive and reflect the signal to the transmitter 72 if the trailer 10 or cargo is within twenty feet of the towing vehicle 12. If the transmitter 72 does not detect a reflected signal from either the trailer receiver 74 or the cargo receiver 76, the alarm 70 will issue an audible alert to warn that the trailer 10 or cargo is being moved away from the towing vehicle 12.

The alarm 70 can be arranged to command the transmitter 72 to periodically transmit a signal to the receivers 74 and 76. For example, the transmitter can send a signal every ten milliseconds and issue an alert if the transmitter 72 does not receive a reflected signal for two consecutive transmissions.

Although this embodiment is shown and described with one receiver attached to one cargo item, it is to be understood that any number of receivers can be placed on any number of cargo items. The transmitter and alarm can be arranged to detect any cargo item being moved away from the towing vehicle. In addition, the transmitter, receivers, and alarm can be arranged to identify which specific cargo item has moved away from the towing vehicle. In addition, a transmitter can be placed on the trailer or cargo and a receiver placed on the towing vehicle. In this arrangement, if the receiver did not receive a scheduled transmitted signal, the alarm would issue an audible alert.

Each embodiment of this invention can optionally include features to prevent unauthorized persons from disabling the alarm system. One such feature is arranging the alarm to detect when electrical power being delivered from the vehicle battery 26 to the alarm 22 and 70 ceases. An unauthorized person may sever the connection from the vehicle battery 26 to the alarm 22 and 70 in an effort to disable the alarm 22 and 70. The alarm 22 and 70, which can optionally be equipped with a backup battery 34 or rechargeable source of power, can issue an audible alert to warn that the alarm 22 and 70 is being tampered with when the alarm 22 and 70 detects that power from the battery 26 has ceased.

Figure 5:
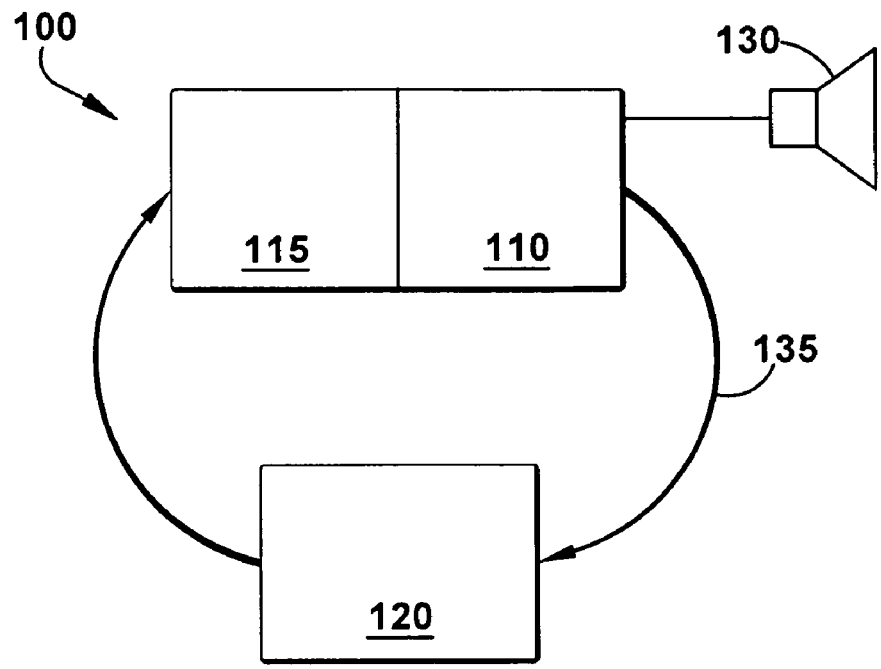
FIG. 5 is a functional block diagram of an alarm arranged in accordance with an embodiment of the present invention.

FIG. 5 is a block diagram that outlines alarm components that can be used to form an alarm system 100. First and second alarm components 110 and 120 are placed within an communication circuit 135 that covers a predetermined area defining a relatively close proximate location between the towing vehicle (not shown) and the trailer or cargo (not shown). One of the first and second alarm components is coupled to the towing vehicle and the other of the components is coupled to the trailer or cargo. One of the components (110 in FIG. 5) includes detection circuitry 115 that is configured to detect the presence of the other alarm component within the communication circuit. Of course, multiple alarm components can be used on a number of trailers or cargo that are to be protected by the alarm system. An alert mechanism, shown symbolically in FIG. 5 as a siren 130 is connected to one of the alarm components and activates a perceptible alert in response to an alert signal from the alarm component.

As outlined above, the alarm components may be connected by a wiring harness to form the communication circuit 135, which may be a dedicated wiring harness between an alarm unit and a sensor or may also serve as the connection for indicator lights on a trailer. In this case, the detection signals that pass between the components may be a test current or voltage sent between an alarm unit on the towing vehicle and the indicator lights on the trailer. The alarm components may be placed within a wireless communication circuit that is tuned to cover a predetermined area to form the communication circuit 135. In this case, the alarm components may be radio frequency transmitters and/or receivers and the signals may be radio frequency transmissions.

Figure 6:
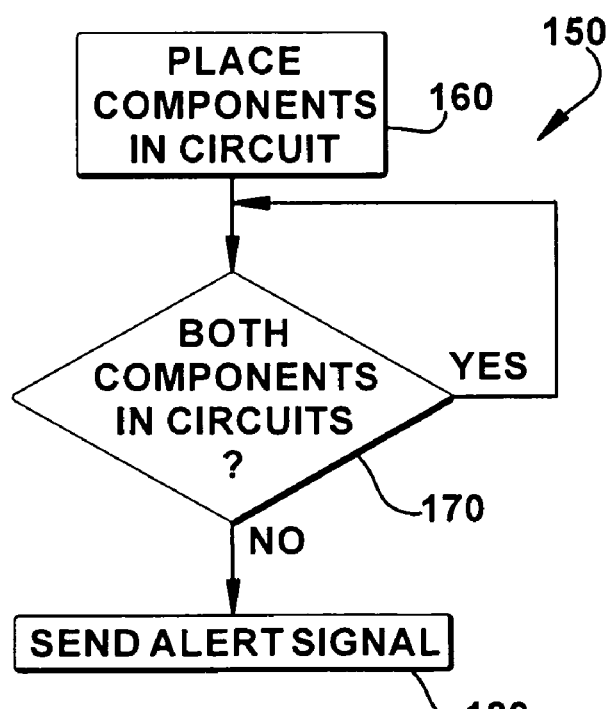
FIG. 6 is a flowchart outlining a method for detecting the proximity of cargo to a towing vehicle according to an embodiment of the present invention.

Referring to FIG. 6, a method 150 for operating the alarm system of FIG. 5 is outlined. At 160, the components are placed in the communication circuit. At 170, the detection signal is used to determine if all components are within the circuit. If all components are not in the circuit, at 180 an alert signal is sent to an alert mechanism such as the siren in FIG. 5.

Although only one sensor is shown and described, it will be understood that any number of sensors can be used in the present invention and attached to any number of cargo items. The sensor head can be arranged to include any number of connection points to communication with any number of sensors and allow the alarm to detect the removal of a single cargo item or all cargo items carried on a trailer.

Figure 7:
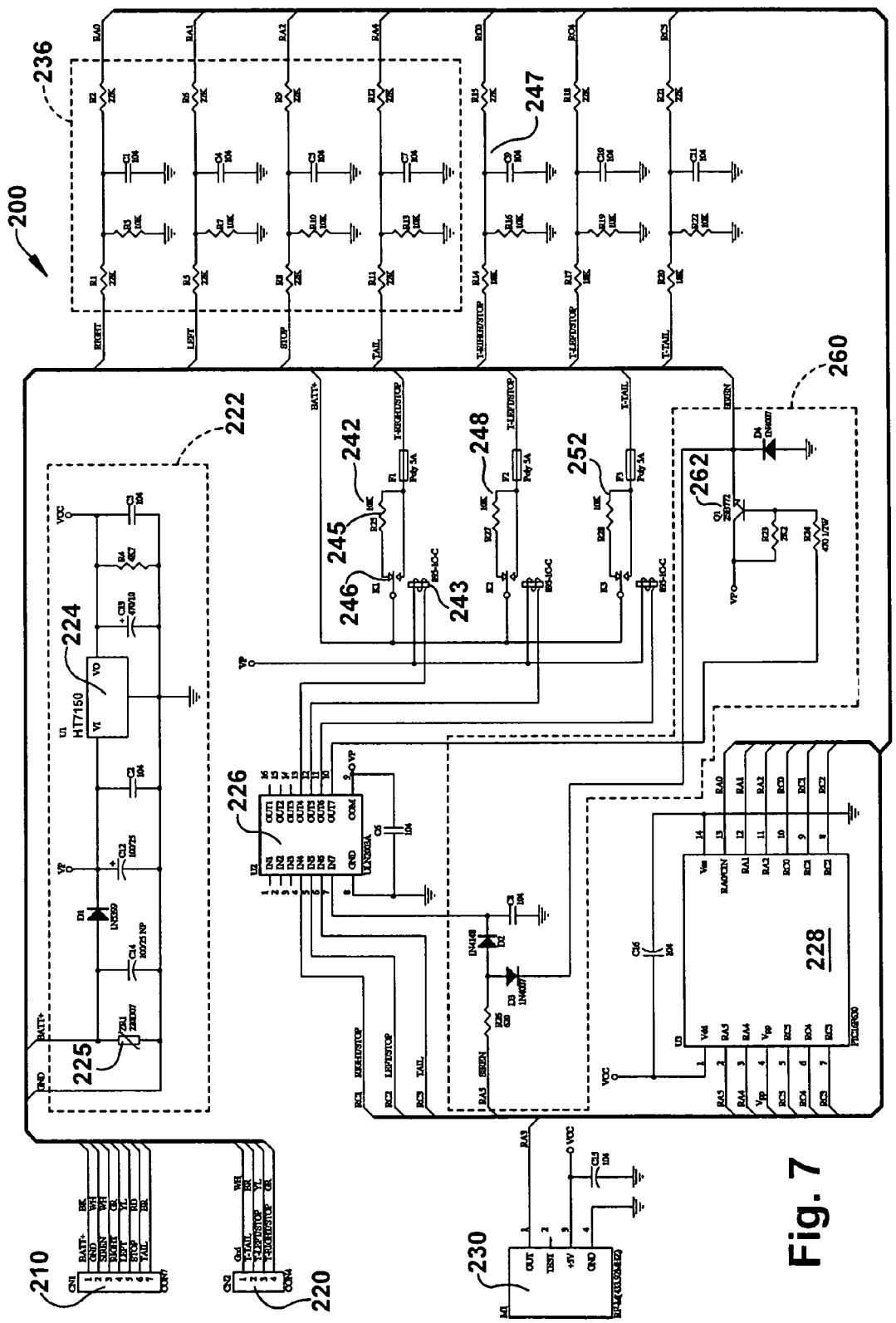
FIG. 7 is an electrical schematic of an alarm constructed in accordance with an embodiment of the present invention.

FIG. 7 is a schematic circuit diagram of an alarm circuit 200 that is placed between a vehicle wiring harness and a trailer lighting receptacle. A six pin input connector 210 is configured to connect with a standard vehicle wiring harness and an additional siren signal line. The input connector 210 provides circuit paths for battery voltage and ground, a siren connection, and right, left, stop, and tail light signals. A four pin output connector 220 is configured to accept a standard four pin trailer light harness and provides circuit paths for a ground connection, tail light signals, and right/stop and left/stop light signals. The alarm 200 accepts the five input signals on the six pins in the input connector 210 and translates them into the four output signals passed by the output connector 220 and a siren actuation signal that is passed to the vehicle via the siren signal connection in the input connector 210.

The alarm 200 includes a voltage regulation circuit, indicated generally by the reference numeral 222. The voltage regulation circuit inputs battery voltage and a reference ground from the vehicle harness and conditions the battery voltage with a surge protector 225 to produce $V_p$, which is used as a high voltage input throughout the alarm 200. A voltage regulator 224 inputs $V_p$ and produces $V_{cc}$, which is used as a 5 volt supply voltage to integrated circuits in the alarm 200. Another voltage related component in the alarm is the voltage PWM controller 230 that produces Vpp, which is used an input to an alarm controller microprocessor 228.

The alarm controller microprocessor 228 inputs the right, left, stop, and tail light signals RA0, RA1, RA2, RA4 from the input connector 210. Based on these inputs, the alarm controller microprocessor produces the tail light and right/stop and left/stop light signals RC1, RC2, RC3 that are output through the output connector 220 to the trailer wiring harness and a siren actuation signal RAS that is routed to the input connector 210 and to an in-vehicle siren (not shown). These control signals are input to a driver IC 226 that is able to handle the power levels necessary to drive the trailer lights.

The alarm controller microprocessor senses whether a trailer wiring harness is properly installed in the output connector 220 using sensing circuits indicated generally as 242, 248, 252. These three sensing circuits operate similarly and only sensing circuit 242, that is associated with the right/stop trailer light will be described in detail. When the trailer wiring harness is properly installed in the output connector 220 and no right/stop trailer lamp lighting is called for, the sensing circuit 242 is in the condition shown in FIG. 7. A contact 246 connects battery voltage through a resistor 245 to ground through the output connector/trailer wiring harness. Due to the presence of the resistor in the circuit path, in this condition, the generated current is insufficient to light the trailer right/stop. If the harness is not present, there is no path to ground, so that current will not flow. A small portion of the current generated by the battery voltage when the trailer wiring harness is installed flows through a current dividing and conditioning circuit 247 that generates a signal voltage for the microprocessor input marked RC0 that indicates proper installation of the trailer wiring harness when no right/stop trailer lamp lighting is required.

When the microprocessor 228 outputs a signal calling for actuation of the right/stop trailer lamp on RC1, the driver IC 226 connects a path to ground for $V_p$ to cause current to flow through the control coil 243. This presence of current in the control coil 243 urges a contact 246 to move down to connect a direct current path without the resistor 245. This will cause a higher level of current to flow through the output connector 220 and trailer wiring harness to light the right/stop trailer lamp. A small portion of the current will flow through the conditioning circuit 247 to generate the input voltage for the microprocessor input RC0. This signal RC0 will verify that the trailer wiring harness is properly installed when the right/stop trailer lamp is to be lit. It will be apparent to one of skill in the art that the other sensing circuits 248 for the left/stop lamp and 252 for the tail lamps operate in a manner analogous to that described for 242.

If at any time when the microprocessor is in an armed condition, any of the input voltages from the sensing circuits RC0, RC4, or RC5 shows an open circuit condition, the siren actuation signal is provided on line RA5. The siren actuation signal flows through a siren driver circuit 260 that includes a siren control transistor 262. The siren actuation signal flows to the base of the transistor 262 to switch the transistor on and cause $V_p$ to be output on the siren signal line through the input connector to activate the siren in the vehicle. In this manner, in addition to providing appropriate signals to the trailer lamps, the microprocessor senses for proper condition and installation of the trailer harness and provides a siren activation output when the harness is not properly installed.

While various aspects of the invention are described and illustrated herein as embodied in combination in the exemplary embodiments, these various aspects may be realized in many alternative embodiments not shown, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however; such values and ranges are not to be construed in a limiting sense and are intended to be critical values or ranges only if so expressly stated.

I claim:

1. A trailer alarm for use with a towing vehicle having one or more vehicle indicator lights comprising:
   an alarm unit coupled to the towing vehicle and disposed in a first electrical circuit through which a light activation signal flows between the vehicle and a trailer, the alarm unit including:
      an alarm input configured to accept the light activation signal;
      an alarm output configured to output the light activation signal to a corresponding trailer indicator light on the trailer; and
      alarm circuitry configured to pass the light activation signal from the alarm input to the alarm output; detect a presence of the trailer indicator light in the first electrical circuit; and provide an alert signal when the trailer indicator light is not detected;
      an alert mechanism in communication with the alarm circuitry configured to receive the alert signal and provide one or more perceptible alerts in response to the alert signal; and
      a sensor disposed within a second electrical circuit through which a sensor detection signal flows between the alarm circuitry and the sensor and wherein the alarm circuitry is configured to detect the presence of the sensor within the second electrical circuit and provide an alert signal when the sensor is not in the circuit.

2. The trailer alarm of claim 1 wherein the alert mechanism comprises an audible siren.

3. The trailer alarm of claim 1 wherein the alarm circuitry includes one or more voltage sensors that sense a voltage that occurs when current flows through the trailer indicator light.

4. The trailer alarm of claim 1 wherein the alarm circuitry includes a detection signal generator that sends a signal through the first electrical circuit to the trailer indicator lights and monitors one or more circuit response parameters to detect the presence of the trailer indicator light in the first electrical circuit.

5. The trailer alarm of claim 1 wherein the alarm circuitry is in electrical communication with an alarm power source.

6. The trailer alarm of claim 5 wherein the alarm power source comprises a vehicle battery that provides electrical power to the towing vehicle.

7. The trailer alarm of claim 5 wherein the alarm power source comprises an alarm battery located within the alarm unit.

8. The trailer alarm of claim 1 comprising an alarm activation mechanism that selectively places the alarm in a trailer detection mode in which the alarm circuitry detects the presence of the trailer indicator light or in a standby mode in which the alarm circuitry does not attempt to detect the presence of the trailer indicator light.

9. A method of detecting the proximity of a trailer to a towing vehicle, wherein the trailer includes one or more trailer indicator lights that correspond to the one or more vehicle indicator lights, the method comprising:
   mounting an alarm unit to the towing vehicle wherein the alarm unit includes alarm circuitry that is placed within a first electrical circuit through which light activation signals flow between the vehicle and the trailer;
   detecting a presence of the trailer indicator lights within the first electrical circuit; and
   providing an alert signal when the trailer indicator lights are not detected within the first electrical circuit;
   wherein the step of detecting a presence of the trailer indicator lights is performed by sending a trailer indicator light detection signal through the first electrical circuit and monitoring a response of at least one electrical circuit parameter to the detection signal;
   further wherein the step of providing an alert signal is performed in response to detection that the trailer indicator lights are not in the first electrical circuit; and
   further wherein the step of providing an alert signal is delayed such that the signal is not provided until the occurrence of two or more successive detections that the trailer indicator lights are not in the first electrical circuit.

10. An alarm for use with a vehicle, the alarm comprising:
    a first alarm component mounted to cargo carried by the vehicle;
    a second alarm component mounted to the vehicle, wherein the first and second alarm components are disposed within a communication circuit covering a predetermined area;
    detection circuitry that is configured to detect the presence of both the first and second alarm components within the communication circuit and to provide an alert signal when one of the first and second alarm components is not detected; and
    an alert mechanism in communication with the detection circuitry configured to receive the alert signal and provide one or more perceptible alerts in response to the alert signal;
    wherein the first alarm component comprises a sensor that includes a circuit completion mechanism that is activated to complete the communication circuit when the sensor is mounted on the cargo and wherein when the sensor is not mounted on the cargo the communication circuit is not completed and wherein when the sensor is mounted on the cargo, the sensor is not electrically connected to the cargo.

11. The alarm of claim 10 wherein the circuit completion mechanism comprises a switch that is urged into a closed position when the sensor is installed on the cargo.

12. The alarm of claim 10 wherein the communication circuit comprises a wiring harness between the sensor and the second alarm component and wherein the second mobile component is configured to detect the sensor by generating a sensor detection signal that passes through the communication circuit and monitoring a response of one or more circuit parameters to the detection signal.

13. The alarm of claim 10 wherein the communication circuit comprises a wireless communication circuit and wherein the first alarm component is a radio frequency receiver configured to reflect a portion of a received transmission back through the communication circuit and wherein the second alarm component is a radio frequency transmitter that periodically transmits a radio detection transmission and receives the reflected portion of the detection transmission when the first alarm component is present in the communication circuit.

14. The alarm of claim 10 wherein the alert mechanism comprises an audible siren.

15. The trailer alarm of claim 10 wherein the detection circuitry includes one or more voltage sensors that sense a voltage that is generated when current flows through the sensor.

16. The alarm of claim 10 comprising an alarm activation mechanism that selectively places the alarm in an alarm mode in which the detection circuitry detects the presence of the first and second alarm components or in a standby mode in which the detection circuitry does not attempt to detect the presence of the alarm components.

17. The alarm of claim 10 wherein the first alarm component includes a vibration sensor that is activated to complete the communication circuit when the vibration sensor is installed on the cargo and wherein when the vibration sensor detects vibration, the vibration sensor breaks the communication circuit.

18. The alarm of claim 10 wherein the first alarm component includes a proximity sensor that is activated to sense the proximity of a proximate alarm component to complete the communication circuit when the proximity sensor is installed on the cargo and wherein when the sensor no longer detects proximity of the proximate alarm component, the proximity sensor breaks the communication circuit.

19. The alarm of claim 10 wherein the first alarm component includes a battery voltage supply receptacle.

20. The alarm of claim 10 wherein the first alarm component is configured to be mounted to a trailered vehicle.

21. The alarm of claim 10 wherein the first alarm component is configured to be mounted to a bike rack.

22. The alarm of claim 10 wherein the first alarm component is configured to be mounted to a cargo carrier.

23. The alarm of claim 10 wherein the first alarm component is configured to be mounted to a cargo item carried by the vehicle.

24. The alarm of claim 10 wherein the first alarm component is configured to be mounted to a trailer connected to the vehicle.

\* \* \* \* \*